United States Patent [19]

Lesher et al.

[11] Patent Number: 4,978,518

[45] Date of Patent: * Dec. 18, 1990

[54] CONTINUOUS VACUUM PROCESS FOR RECOVERING VROMINE

[75] Inventors: Kenneth C. Lesher; Herbert W. Henry, both of Magnolia, Ark.

[73] Assignee: Ethyl Corporation, Richmond, Va.

[*] Notice: The portion of the term of this patent subsequent to Jan. 12, 2005 has been disclaimed.

[21] Appl. No.: 75,956

[22] Filed: Jul. 21, 1987

Related U.S. Application Data

[63] Continuation-in-part of Ser. No. 622,197, Jun. 19, 1984, Pat. No. 4,725,425.

[51] Int. Cl.⁵ .................. B01D 3/10; C01B 7/09
[52] U.S. Cl. ........................... 423/504; 203/31; 203/93; 423/507
[58] Field of Search ............ 423/500, 504, 507; 203/29, 31, 92, 93, DIG. 25; 202/84, 91, 99, 158, 267 R

[56] References Cited

U.S. PATENT DOCUMENTS

| | | | |
|---|---|---|---|
| 3,959,450 | 5/1976 | Calloue et al. | 423/507 |
| 4,031,194 | 6/1977 | Ogawa et al. | 423/507 |
| 4,125,595 | 11/1978 | Kunze et al. | 432/504 |
| 4,175,034 | 11/1979 | Thompson | 203/92 |
| 4,719,096 | 1/1988 | Lesher et al. | 423/504 |
| 4,725,425 | 2/1988 | Lesher et al. | 423/504 |

FOREIGN PATENT DOCUMENTS 138890  10/1979  Japan ........................ 423/507

OTHER PUBLICATIONS

"Packed Column Internals", Chen. Chemical Engineering, 3-5-84.
Kirk-Othmer Encyclopedia of Chemical Technology, 3rd ed. John Wiley & Sons, vol. 4, pg. 233-236(1978); vol. 7, p. 885 (1979).

Primary Examiner—Jeffrey E. Russel
Attorney, Agent, or Firm—Joseph D. Odenweller; E. E. Spielman, Jr.

[57] ABSTRACT

A continuous process for the extraction of bromine from a bromide-rich brine in high efficiency while dramatically reducing the steam requirement for the distillation by operating a contact tower under vacuum. The contact tower is designed to operate near the boiling point of the feed brine so that only stripping steam is needed to remove elemental bromine from the brine.

8 Claims, 1 Drawing Sheet

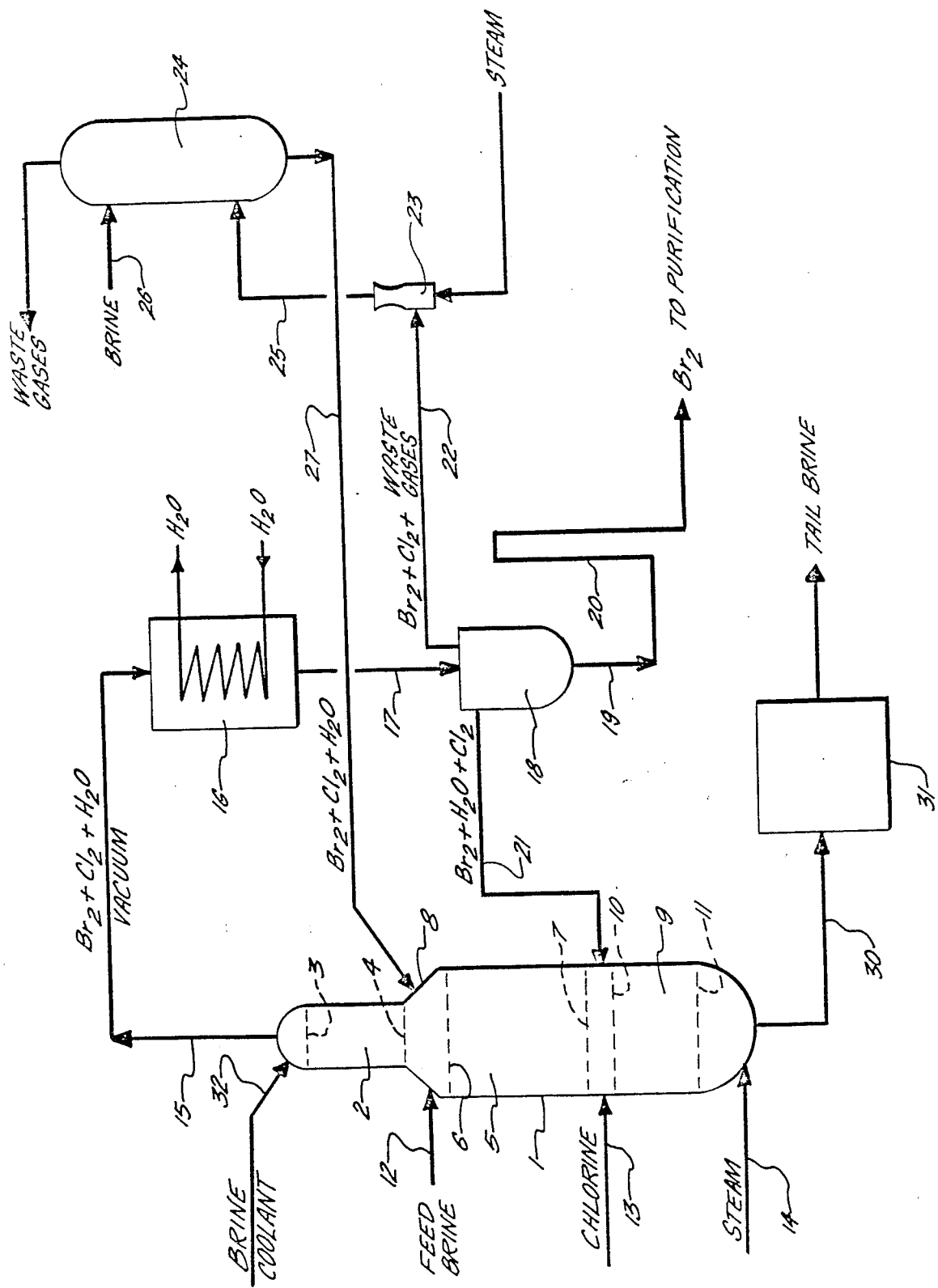

CONTINUOUS VACUUM PROCESS FOR RECOVERING VROMINE

This application is a Continuation-in-Part of application Ser. No. 622,197 filed June 19, 1984, now U.S. Pat. No. 4,725,425.

BACKGROUND OF THE INVENTION

1. Field of the Invention

The present invention relates to a highly efficient continuous process for the extraction of bromine whereby chlorine is contacted with bromide-rich brine to obtain free bromine. More particularly, the present invention is directed to a process for the extraction of bromine involving chlorine and steam distillation by vacuum operation to recover the bromine thus formed from the original brine. The brine enters a contact tower at approximately 180°-210° F. The contact tower is under a vacuum of about 6 to about 12 psia. Thus, when the naturally hot brine enters the vacuum contact tower, the brine is at its boiling point without the need for supplemental heating.

2. Description of the Prior Art

In the past, bromine has been produced from bromide containing solutions by the "Kubierschky's distillation method," or a modification thereof. In that method a bromide solution is fed counter-currently in a multiple plate contact tower, made of granite or similar material. Chlorine gas is fed into the bottom of the tower, and contacts the bromide solution which is fed from the top of the column. Bromine, which is produced by the reaction, is distilled from the top of the tower by the introduction of steam from the bottom of the tower, and is recovered.

Bromine recovery by this method requires a significant amount of steam for preheating the inlet brine to bring the bromine to boiling to allow the gaseous bromine produced by the oxidation reaction with the chlorine to be stripped from the solution. The amount of steam required depends upon the temperature of the brine entering the contact tower.

The prior art has utilized various processes for the recovery of bromine. Thus, U.S. Pat. No. 4,125,595 discloses a process for producing highly pure bromine from bromide-containing solutions by introducing steam and chlorine counter-current to the heated bromide-containing solution into a column having a reboiler. The reboiler has a liquid and a gaseous zone. Gaseous bromine, chlorine and steam exit the column overhead. About 40% to 80% of the theoretically needed steam is injected into the lower third of the liquid zone in the reboiler. The remainder of the steam is added depending on the amount of the bromine-chlorine steam mixture withdrawn overhead from the column into the gaseous zone of the reboiler or the lower part of the bromine column.

Another process for the recovery of bromine is disclosed in U.S. Pat. No. 4,031,194. This describes a continuous process for the preparation of bromine without loss of bromine from the bottom of the tower by removing bromine from the middle of the contact tower. The reaction between the chlorine and the brine occurs in the top of the column. A portion of the free bromine generated by the reaction is heated by the exotherm from the reaction and rises and is discharged from the middle of the contact tower. Steam distillation is used to recover the remaining bromine from the middle section.

SUMMARY OF THE INVENTION

A continuous process for the extraction of bromine from a bromide-rich brine in high efficiency while dramatically reducing the steam requirement for the distillation has been discovered. This is accomplished by operating the contact tower under vacuum. The contact tower is operated near the boiling point of the feed brine so that the only steam needed is to remove elemental bromine from the brine.

BRIEF DESCRIPTION OF THE DRAWING

The FIGURE is a schematic diagram of the apparatus for the continuous extraction of bromine according to the invention.

DETAILED DESCRIPTION OF THE PREFERRED EMBODIMENTS

An energy efficient continuous process for recovering elemental bromine from bromide-rich brine said process comprising:

(a) continuously introducing said bromide-rich brine into the upper portion of an elongated upright enclosed chamber;

(b) continuously introducing chlorine and steam into the lower portion of said chamber whereby said chlorine contacts said bromide-rich brine in a counter current manner;

(c) continuously removing gaseous bromine, chlorine and water from the top of said chamber;

(d) continuously removing bromide-depleted brine from the bottom of said chamber; and (e) maintaining a vacuum within said chamber.

Brine is an aqueous solution which is nearly saturated with halide salts. For the purposes of the present invention alternative terminology would include an aqueous solution of a bromide. Bromine may also be produced from hydrobromic acid by the process of the present invention.

Brine is produced in several areas of the United States. Brine typically may contain natural gas, crude oil, hydrogen sulfide, sodium chloride, sodium bromide and other salts. The amount of sodium bromide present in the brine depends on the individual formation. However, for the purposes of the present invention, it is generally estimated that there is approximately 2000-6000 parts per million of sodium bromide in brine. The brine is first treated to remove natural gas, crude oil and hydrogen sulfide before it enters the contact tower. Bromine is obtained from the brine using chlorine which reacts with the sodium bromide to produce sodium chloride and elemental bromine. The bromine is stripped from the brine using steam distillation under vacuum.

Contact towers are traditionally made of granite. The granite towers are very sensitive to overpressuring during process upsets which frequently occur during normal tower operation. The overpressuring may result in tower granite breakage or gasket damage and could potentially cause the entire tower to collapse.

The present invention contact tower which is operated under vacuum can be constructed of any material which can withstand the vacuum without collapsing and which is not adversely affected by contact with brine, chlorine and bromine. Such materials as metals or metal alloys (e.g., titanium), carbon steel lined with acid brick and the like are suitable. Especially useful materials of construction are reinforced plastics such as fiberglass reinforced plastics (e.g., fiberglass reinforced polyester) carbon fiber reinforced plastics (e.g., graphite fiber reinforced polyester). These should be rated to withstand full service vacuum at temperatures up to 230° F.

The apparatus used to conduct the process comprises an upright elongated substantially cylindrical enclosed chamber 1 which functions as the contact tower. Chamber 1 includes an upper rectification zone 2 of somewhat smaller diameter than the lower portions of the chamber. Rectification zone 2 is filled with contact packing maintained between perforate retainers 3 and 4 thereby increasing rectification efficiency. Any contact packing may be used in the practice of the present invention. Typical materials include ceramic or metal. Below rectification zone 2 is reaction zone 5 which is also filled with contact packing held in position by perforate retainers 6 and 7. Rectification zone 2 is connected to reaction zone 5 by conical section 8.

Stripping zone 9 is located below reaction zone 5 and also contains contact packing to provide a high contact surface. The contact packing is contained between perforated retainers 10 and 11.

Brine conduit 12 enters the space between rectification zone 2 and reaction zone 5 and is adapted to distribute feed brine fairly uniformly across the top of retainer 6.

Chlorine feed conduit 13 enters chamber 1 into the space between reaction zone 5 and stripping zone 9. Multiple chlorine feed points are provided to obtain uniform chlorine distribution across the entire chamber cross-section.

Stripping steam is fed through steam conduit 14 at the bottom of the chamber 1 to steam nozzles (not shown) which distribute steam across the entire cross-section.

At the top of chamber 1 above rectification zone 2 is suction conduit 15 which connects through condenser 16 and condensate conduit 17 to separator 18 in which bromine separates from an aqueous phase which will be explained later.

The bottom of separator 18 is drained through bromine conduit 19 which contains a seal loop 20 to control the bromine-water phase separation interface in separator 18. The upper aqueous phase in separator 18 is returned to chamber 1 via recycle conduit 21.

The top of separator 18 is connected through vacuum conduit 22 to steam ejector 23 which is sized to provide the required vacuum in chamber 1.

Exhaust steam from ejector 23 is conducted to scrubber 24 via conduit 25. Scrubber 24 is filled with contact packing to provide a high surface area. Bromide-rich well brine is introduced into the top of scrubber 24 through conduit 26. The bottom of scrubber 24 is connected via drain conduit 27 back to chamber 1.

Tail brine conduit 30 connects the bottom of chamber 1 to neutralizer 31.

Temperature of vapor leaving through suction conduit 15 is controlled by introducing brine coolant through conduit 32 above rectification zone 2. At an operating pressure of about 6–12 psia the vapor temperature is maintained at about 100°–150° F.

In operation, the pressure within chamber 1 is reduced by steam injector 23 which applies suction through vacuum conduit 22, separator 18, condensate conduit 17, condensor 16 and suction conduit 15 to chamber 1 above rectification zone 2. The pressure within chamber 1 is reduced to approximately the vapor pressure of the bromide-rich feed brine. Accordingly the reduced pressure will depend on the temperature of the feed brine which is generally in the range of 180°–210° F.

Feed brine is then introduced through brine feed conduit 12 into the space between rectifier zone 2 and reaction zone 5. The feed brine is uniformly distributed across the entire surface of the reaction zone. The bromide-rich brine then trickles down through the reaction zone.

The above apparatus also includes the appropriate valves and seal loops to separate the various sections which are at different pressures.

Concurrently, chlorine is injected into the space between the stripping zone and reaction zone and distributed uniformly through this space. Steam is likewise injected below the stripping zone. The chlorine gas moves counter current to the feed brine and passes up through the reaction zone wherein it intimately contacts the feed brine trickling through the contact packing. The chlorine reacts with the bromide in the brine and converts the bromide salts to elemental bromine.

The bromine-depleted brine then passes down into the stripping zone and trickles through the contact packing in the stripping zone. Steam injected through steam conduit 14 below the stripping zone passes upwardly through the stripping zone and removes residual chlorine and bromine from the bromide-depleted brine. The steam stripped bromide-depleted tail brine then is removed from the bottom of chamber 1 through tail brine conduit 30 which conducts the tail brine to neutralizer 31 wherein it is neutralized and discharged.

Steam injected through conduit 14 continues upward through stripping zone 9 and reaction zone 5 wherein it vaporizes free bromine which is conducted together with the steam and chlorine up and through rectification zone 2. The temperature of the vapor leaving rectification zone 2 is controlled by introducing brine coolant through conduit 32 on the top surface of rectification zone 2. This reduces the temperature of the vapor to minimize the water carry over while still retaining bromine and chlorine in the vapor phase. The gaseous bromine, chlorine and residual steam pass through suction line 15 to condensor 16 where the bromine and water are condensed to the liquid phase. The liquid phase drains through condensate conduit 17 into separator 18 wherein a lower bromine phase and an upper aqueous phase form. The lower bromine phase is drained through bromine conduit 19 and seal loop 20 to a bromine purification system. Seal loop 20 is adjusted such that the aqueous phase does not enter bromine conduit 19 and the bromine phase does not enter recycle conduit 21. The upper aqueous phase contains both chlorine and bromine and is conducted through recycle conduit 21 back into chamber 1. The vapor phase in separator 18 is drawn by suction through vacuum conduit 22 into steam injector 23. The exhaust steam from injector 23 contains bromine and chlorine and is passed into scrubber 24. Brine is introduced through conduit 26 into the top of scrubber 24. Scrubber 24 is filled with a high surface contact packing. Brine passing down through scrubber 24 absorbs bromine and chlorine from the steam injector exhaust and conducts this liquid phase through drain conduit 27 back to chamber 1 for further bromine recovery.

The feed brine is preferably at an elevated temperature. In general, the temperature of feed brine obtained from deep wells is in the range of 180°–210° F. The optimum reduced pressure within chamber 1 is that which is equivalent to the vapor pressure of the feed brine at the feed temperature. In general, a reduced pressure of about 6–12 and more often 7–8 psia gives good results.

The amount of chlorine injected through conduit 13 depends on the total brine feed and the bromide content of the brine. The chlorine should be at least the stoichiometric amount required to oxidize total bromide to bromine. In practice, an excess of chlorine is used.

The process is very energy efficient because the amount of steam required to operate the process is much less than that which would be required to operate the same process at atmospheric pressure. At atmospheric pressure, the steam must heat the feed brine up to its boiling point in addition to vaporizing the bromine. In so doing, a substantial amount of energy is wasted. Accordingly, the present process and apparatus provides a means of conserving energy when recovering bromine from bromide-rich brine.

We claim:

1. A continuous process for recovering elemental bromine from bromide-containing brine said process comprising:
   (a) continuously introducing said bromide-containing brine into the upper portion of an enclosed chamber;
   (b) continuously introducing chlorine and steam into the lower portion of said chamber whereby said chlorine contacts said bromide-containing brine in a counter current manner;
   (c) continuously removing gaseous bromine and water from the top of said chamber;
   (d) continuously removing bromide-depleted brine from the bottom of said chamber; and
   (e) maintaining a sub-atmospheric pressure within said chamber.

2. A process of claim 1 wherein said gaseous bromine and water are removed by applying a sub-atmospheric pressure at the top of said chamber thereby drawing off said gaseous bromine and water.

3. A process of claim 2 wherein said gaseous bromine and water drawn off by said sub-atmospheric pressure are condensed to form a condensate comprising a lower bromine phase and an upper aqueous phase and said bromine is recovered from said lower bromine phase.

4. The process of claim 2 wherein said bromine-containing brine is introduced into said chamber at a temperature of about 180°–210° F. and said sub-atmospheric pressure within said chamber is about 6–12 psia.

5. A process of claim 1 wherein said bromide-containing brine is introduced into said enclosed chamber at a temperature of about 180°–210° F. and said sub-atmospheric pressure within said chamber is about 6–12 psia.

6. A continuous process for recovering elemental bromine from bromide-containing brine, said process comprising:
   (a) continuously introducing said bromide-containing brine into an enclosed chamber, said enclosed chamber being an upright elongated chamber comprising an upper rectification zone, a central reaction zone and a lower stripping zone, said bromide-containing brine being introduced into a space in said upright elongated chamber between said upper rectification zone and said central reaction zone;
   (b) continuously introducing chlorine and steam into said enclosed chamber said chlorine being introduced into a space in said upright elongated chamber between said central reaction zone and said lower stripping zone, whereby said chlorine contacts said bromide-containing brine in said reaction zone in a counter current manner and produces gaseous bromine, said steam being introduced into a space below said lower stripping zone of said upright elongated chamber wherein said steam contacts said bromide-containing brine before said bromide-containing brine is removed from the bottom of said upright elongated chamber, and residual bromine is stripped from said bromide-containing brine;
   (c) continuously removing gaseous bromine, chlorine and residual steam from the top of said upright elongated chamber, said gaseous bromine, chlorine and residual steam being removed by maintaining a sub-atmospheric pressure in the range of from about 6 to about 12 psia at the top of said upright elongated chamber above said upper rectification zone thereby drawing off said gaseous bromine, chlorine and residual steam;
   (d) continuously removing tail brine from the bottom of said upright elongated chamber; and
   (e) maintaining a sub-atmospheric pressure in the range of from about 6 to about 12 psia within said upright elongated chamber.

7. The process of claim 6 wherein said bromide-containing brine is introduced into said space between said upper rectification zone and said central reaction zone at a temperature of about 180°–210° F.

8. The process of claim 6 wherein said vacuum maintained within said upright elongated chamber is at a sub-atmospheric pressure approximately that of the vapor pressure of the bromide-containing feed brine.

* * * * *

UNITED STATES PATENT AND TRADEMARK OFFICE
CERTIFICATE OF CORRECTION

PATENT NO.   : 4,978,518
DATED        : DECEMBER 18, 1990
INVENTOR(S)  : KENNETH C. LESHER ET AL.

It is certified that error appears in the above-identified patent and that said Letters Patent is hereby corrected as shown below:

On the title page:
[54] reads "CONTINUOUS VACUUM PROCESS FOR RECOVERING VROMINE" and should read -- CONTINUOUS VACUUM PROCESS FOR RECOVERING BROMINE -- .

On the title page:
Under [56] "References Cited" reads Kunze et al. 432/504" and should read -- Kunze et al. 423/504 -- .

Column 1, line 2, reads "CONTINUOUS VACUUM PROCESS FOR RECOVERING VROMINE" and should read -- CONTINUOUS VACUUM PROCESS FOR RECOVERING BROMINE -- .

Signed and Sealed this

Twenty-first Day of April, 1992

Attest:

HARRY F. MANBECK, JR.

*Attesting Officer*       Commissioner of Patents and Trademarks